(12) United States Patent
Nowotarski et al.

(10) Patent No.: US 8,312,496 B2
(45) Date of Patent: Nov. 13, 2012

(54) MEASURING THE FREQUENCY RESPONSE OF A CATV NETWORK

(75) Inventors: Adam A. Nowotarski, Indianapolis, IN (US); Daniel K. Chappell, Greenwood, IN (US)

(73) Assignee: Acterna LLC, Germantown, MD (US)

( * ) Notice: Subject to any disclaimer, the term of this patent is extended or adjusted under 35 U.S.C. 154(b) by 728 days.

(21) Appl. No.: 12/430,230

(22) Filed: Apr. 27, 2009

(65) Prior Publication Data

US 2009/0268034 A1 Oct. 29, 2009

Related U.S. Application Data

(60) Provisional application No. 61/048,254, filed on Apr. 28, 2008.

(51) Int. Cl.
*H04N 7/173* (2011.01)
(52) U.S. Cl. .......................... 725/107; 725/114; 348/181
(58) Field of Classification Search .................. 725/107, 725/114; 348/181
See application file for complete search history.

(56) References Cited

U.S. PATENT DOCUMENTS

| | | | | |
|---|---|---|---|---|
| 4,408,227 A | 10/1983 | Bradley | ........................ | 348/192 |
| 4,700,222 A | 10/1987 | Large et al. | .................... | 348/192 |
| 5,233,418 A | 8/1993 | Gumm et al. | .................. | 348/181 |
| 5,249,305 A * | 9/1993 | Wieczorek et al. | ........... | 455/517 |
| 5,585,842 A | 12/1996 | Chappell et al. | ............... | 348/192 |
| 5,867,206 A | 2/1999 | Voght et al. | .................... | 725/107 |
| 6,278,485 B1 * | 8/2001 | Franchville et al. | .......... | 348/192 |
| 6,961,370 B2 * | 11/2005 | Chappell | ....................... | 375/224 |
| 7,350,225 B2 * | 3/2008 | Ovadia | ........................... | 725/107 |
| RE42,317 E * | 5/2011 | Al-Dhahir et al. | ............ | 348/614 |

* cited by examiner

*Primary Examiner* — Brian Pendleton
*Assistant Examiner* — Nnenna Ekpo
(74) *Attorney, Agent, or Firm* — Matthew A. Pequignot; Pequignot + Myers LLC

(57) ABSTRACT

An apparatus and method for frequency sweeping a CATV network, suitable for an upstream path frequency sweeping, is presented. A narrowband test signal is injected into the network by a generator coupled to a cable modem during a time interval allocated by the head end for the cable modem to transmit a modulated digital signal. The amplitude of the test signal is lower than the amplitude of the modulated digital signal, so as not to impair reception of said digital signal at the head end. The frequency of the test signal is swept, and the amplitude of the received test signal is measured. A telemetry or a digital signal transmission is used to communicated the values of the amplitude of the test signals between the injection and the measurement locations of the network.

18 Claims, 7 Drawing Sheets

MEASURING THE FREQUENCY RESPONSE OF A CATV NETWORK

CROSS-REFERENCE TO RELATED APPLICATIONS

The present invention claims priority from U.S. provisional patent application No. 61/048,254, filed Apr. 28, 2008, which is incorporated herein by reference.

TECHNICAL FIELD

The present invention relates to measuring the frequency response between two points of a community antenna television (CATV) network, and in particular to measuring the frequency response utilizing a test signal having a relatively low amplitude.

BACKGROUND OF THE INVENTION

A cable television network is a system for providing television services to consumers via radio frequency signals transmitted to television sets through fixed coaxial cables as opposed to an over-the-air method used in traditional television broadcasting, in which a television antenna was required. The abbreviation CATV is often used to mean "Cable TV". It originally stood for "Community Antenna Television", from the cable television's origins in 1948: in areas where the over-the-air reception was limited by mountainous terrain, large "community antennas" were constructed, and a cable was run from the community antennas to individual homes.

A CATV network consists of a controlling center, or so called "head end" facility, whose function is to control video and data traffic in the network by generating and, or distributing video and data signals, and a cable plant, whose function is to broadcast these signals to subscribers. Therefore, the cable plant is the communications medium of a CATV network. Typically, the cable plant comprises a broadband transmission cable over which signals are transmitted from the head end facility to home transceivers, by generating outbound or downstream signals, as well as from home transceivers to the head end facility, by generating inbound or upstream signals. Broadband coaxial cables are advantageously used in this application because, inter alia, they support a large frequency bandwidth, of about 1 GHz or more, and provide signal shielding at a moderate cost in comparison to other media. The wide frequency bandwidth permits the definition of a substantial number of channels on the cable thus allowing simultaneous transmission of inbound and outbound signals. Each signal occupies a particular frequency band, or a channel, on the cable.

CATV systems have, in recent years, moved beyond merely providing analog television signals by broadcasting these signals over the cable to subscribers in their homes. Digital video services have become more popular than analog television services due to more efficient bandwidth utilization, and due to their intrinsic high-definition video (HDTV) capabilities. Further, a subscriber of a CATV network has been given a voice in many systems. An advantaged subscriber nowadays has a transceiver, or a modem, which allows the transmission of signals upstream to the head end of the network. Among the many services that the subscribers have access to by having the transceiver or the modem are the purchase of extra-cost special programs and home shopping on television catalogue services, an Internet service, and a voice-over-IP (VoIP) phone service.

A subscriber sends an upstream signal to the head end through a TV set, a computer, a VoIP phone, or other generating means connected to his transceiver or modem. His entry is encoded in a digital format and becomes, potentially with the address of his station and other enabling data, a data packet for transmission to the head end. The data packet is used to modulate a radio frequency carrier wave and is transmitted to the head end through the cable plant of the CATV network.

In general, a given channel can effectively support only one signal at a time. If more than one signal appears simultaneously on a channel, one signal source will usually dominate the detectors tuned to the channel, excluding all weaker signal sources while it is transmitting, or, where the signal strength of individual transmitters is more or less equal, the signals will interfere with one another and the intelligence comprehended by each signal will be confused with that of the other signal. In either case, access by some or all transceivers is lost. If channel availability on a coaxial cable was unlimited, such matters would be of no consequence, because each subscriber could be given a dedicated channel on the cable for access to the head end facility. Unfortunately, this is not the case, and the number of upstream channels available is almost certain to be far less than the number of subscribers desiring to use the system.

However, the transmission of subscriber-initiated inbound signals is either of a short duration, or it can be broken into short-duration bursts. For example, an outgoing voice signal from a VoIP phone user is broken into short-duration segments, by using a real-time signal compression at the transmitter end, and is recombined using a real-time signal decompression at the receiver end, allowing one to preserve the continuity of the voice at the receiver end. Accordingly, the system designer only needs to assign one or, at most, a handful of channels to accommodate all subscriber-generated inbound signals. As a result, a single upstream channel may potentially be used for thousands of subscribers without the interference between the signals becoming apparent to the subscriber.

The above mentioned growth of functionality of cable based networks, with more and more features and functions added to the subscriber's benefit, has to be matched by a growing effort to assure the quality of the existing services. To avoid interruption or impairment of the existing services, a periodic maintenance and testing of the network is required. Of such a testing, a frequency sweep of the network, allowing one to measure the frequency response of a CATV network between two points of the network, is a common task.

Traditionally, the frequency sweep is performed by injecting a test signal having a constant amplitude and continuously changing frequency at one point of the network, and measuring the amplitude of the test signal at another point of the network. The ratio of the amplitudes of the test signal between the two points, measured as a function of the test signal frequency, allows one to evaluate the attenuation of a signal, as a function of frequency, between the measurement and the injection points. In other words, the attenuation of a broadcasted or a subscriber-generated signal occupying a particular frequency channel or band can be evaluated from the frequency sweep test. When the attenuation rises above a certain threshold value, a reliable data reception and transmission cannot be guaranteed. A periodically performed frequency sweep test should allow the service provider to correct the problem that caused the attenuation to rise before a subscriber is aware of the problem, thus maintaining a high quality of service.

A significant drawback of performing periodic frequency sweeps, or even a single frequency sweep for that matter, is that the test signal of the frequency sweep interferes with broadcasted or subscriber-generated signals, disrupting normal performance of a CATV network. One can, of course, use only the unallocated frequencies for the sweep, and interpolate between the measured points corresponding to attenuation at those unallocated frequencies; however, as CATV networks have increased the number of channels broadcasted, the availability of spectrum to inject these test signal has decreased, resulting in problems in maintaining CATV networks and measuring the frequency response thereof.

The problem of interference during frequency sweeps has long been recognized. For example, U.S. Pat. No. 4,408,227 incorporated herein by reference, entitled "Method and Apparatus for Television Distribution System Sweep Testing", and issued on Oct. 4, 1983 in the name of Bradley, discloses a distribution system sweep test, in which the test signal is time multiplexed with the program signal to prevent interference. The test signal is injected during vertical blanking intervals of an analog TV raster signal. The test signal locations are normally between lines 17 and 20 of an analog TV signal since the Federal Communications Commission of the United States of America has authorized test signal injection for this particular area of an analog TV signal. Similarly, U.S. Pat. No. 4,700,222 incorporated herein by reference, entitled "*Apparatus and Method of Testing the Frequency Response of a Cable Television System*", and issued on Oct. 13, 1987 in the name of Large et al., relates to testing the frequency response of a CATV system by transmitting test signals of varying frequency during blanking intervals of an analog TV signal.

Disadvantageously, the systems of Bradley and Large rely on presence of blanking intervals in an analog TV signal. Since the blanking intervals are absent in digital signals, these systems cannot be used to test a modern CATV network having digital TV channels or channels allocated for an upstream traffic such as an upstream Internet traffic.

U.S. Pat. No. 5,233,418 incorporated herein by reference, entitled "*CATV Sweep System Using a Gated Receiver*", and issued on Aug. 3, 1993 in the name of Gumm et al., relates to a method of determining the frequency characteristics of a CATV by inserting test pulses in the vertical interval between equalizer pulses of an RF video signal. Again, this system is not readily compatible with the abovementioned modem digital CATV networks.

U.S. Pat. No. 5,867,206 incorporated herein by reference, entitled "*CATV Frequency Sweep Testing Using RF Transmitter to Generate Test Signals*", and issued on Feb. 2, 1999 to Voght et al., relates to frequency sweep testing of a CATV system by testing only unused channel frequencies. Disadvantageously, as the number of unused channels in a network decreases due to adding new services and functions as noted above, so does an opportunity of frequency sweeping a CATV network using the method of Voght.

Further, U.S. Pat. No. 6,961,370 incorporated herein by reference, entitled "*Sweep Method Using Digital Signals*", and issued Nov. 1, 2005 in the name of Chappell, relates to determining the frequency response of a CATV system by obtaining an absolute signal strength measurement and a relative frequency response measurement for a selected digital channel frequency. While the method of Chappell solves the problem of obtaining the frequency response without disrupting transmission of signals on the forward path, that is, from the head end towards a subscriber of a CATV network, this method cannot be used on the reverse path, since it is the head end that broadcasts signals at various frequencies, which can be used for the frequency response measurement on the forward path of the broadcasted signal.

Finally, U.S. Pat. No. 6,278,485 incorporated herein by reference, entitled "*Preconfigured CATV Sweep Testing Method and Apparatus*", and issued on Aug. 21, 2001 in the name of Franchville et al., discloses sweep testing a reverse path in a subscriber's CATV network. While the method of Franchville allows one to obtain necessary reverse frequency sweep data, it has a serious drawback of disrupting normal transmission.

An object of the present invention is to overcome the shortcomings of the prior art by providing sweep test on both the forward and the reverse path of a CATV network. Importantly and advantageously, the apparatus and the method of frequency sweeping according to the present invention allows one to perform the sweep without interfering with normal transmission of data.

SUMMARY OF THE INVENTION

In accordance with the present invention there is provided a method for measuring a frequency response between a first test point and a second test point of a cable television (CATV) network comprising: a head end for generating and receiving modulated digital signals, wherein each said modulated digital signal occupies a pre-defined frequency band; and a cable plant for propagating said modulated digital signals, wherein a cable modem is operationally coupled to the first test point, the method comprising:

(a) injecting, at the first test point, a test signal having an amplitude and a first frequency, wherein the injecting of the test signal occurs during a transmission time slot allocated by the head end for the modem to transmit a signal to the head end;

wherein the frequency of the injected test signal is within a target frequency band and wherein the target frequency band is one of the pre-defined frequency bands, and wherein a bandwidth of the test signal is sufficiently narrow so as not to impair reception of a modulated digital signal occupying said target frequency band, wherein said modulated digital signal is a target signal;

wherein the amplitude of the injected test signal is sufficiently low so as not to impair reception of said target signal; and the amplitude of the injected test signal is sufficiently high so as to be measurable at the second test point;

(b) receiving the test signal at the second test point during a reception time slot that is delayed relative to the transmission time slot by a time of propagation of the test signal between the first and the second test points of the CATV network;

(c) measuring the amplitude of the test signal at the second test point during the reception time slot;

wherein during step (b), or (c), or both, all signals received during a time that is outside of the reception time slot are suppressed;

(d) dividing the amplitude of the received signal by the amplitude of the injected signal, so as to obtain the frequency response of the CATV network between the first and the second test points at the first frequency; and (e) repeating steps (a) to (d) at a second frequency different from the first frequency, so as to obtain the frequency response of the CATV network between the first and the second test points at the second frequency.

In accordance with another aspect of the invention there is further provided a test system for measuring a frequency response between a first test point and a second test point of a cable television (CATV) network comprising: a head end for generating and receiving modulated digital signals, wherein each said digital signal occupies a pre-defined frequency band; and a cable plant for propagating said modulated digital signals; wherein the system comprises:

a cable modem operationally coupled to the first test point, for generating and receiving modulated digital signals;

an injector operationally coupled to the first test point, for injecting, during a transmission time slot allocated by the head end for the modem to transmit a signal to the head end, a test signal having an amplitude and a test frequency, and for suppressing said test signal during a time that is outside of the transmission time slot, wherein:

the frequency of the test signal to be injected is within a target frequency band, wherein the target frequency band is one of the pre-defined frequency bands, and a bandwidth of the test signal is sufficiently narrow so as not to impair reception of a modulated digital signal occupying said target frequency band, wherein said modulated digital signal is a target signal;

the amplitude of the test signal to be injected is sufficiently low so as not to impair reception of said target signal; and the amplitude of the test signal to be injected is sufficiently high so as to be measurable at the second test point;

an injector controller operationally coupled to the modem and to the injector, for receiving a digital signal from the cable modem and for controlling, in dependence upon said received digital signal, values of the amplitude and the frequency of the test signal to be injected during the transmission time slot;

a selector operationally coupled to the second test point, for suppressing the target signal and selecting the test signal at the test frequency during a reception time slot that is delayed relative to the transmission time slot by a time of propagation of the test signal between the first and the second test points of the CATV network;

a detector operationally coupled to the selector, for receiving the selected test signal from the selector and for measuring the amplitude of the selected test signal during the reception time slot;

wherein either detector or selector, or both, comprise a circuit for suppressing all signals during a time that is outside of the reception time slot;

a communication device operationally coupled to the second test point, for generating and receiving modulated digital signals; and a processor operationally coupled to the communication device, to the selector, and to the detector, for communicating to the injector controller the values of the amplitude and, or the frequency of the test signal to be injected, by causing the communication device to send a corresponding modulated digital signal through the CATV network;

for communicating the value of the frequency of the test signal to the selector;

for obtaining the measured amplitude of the received test signal from the detector; and for dividing the measured amplitude by the injected amplitude of the test signal, so as to obtain the frequency response of the CATV network between the first and the second test points, at the frequency of the test signal.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
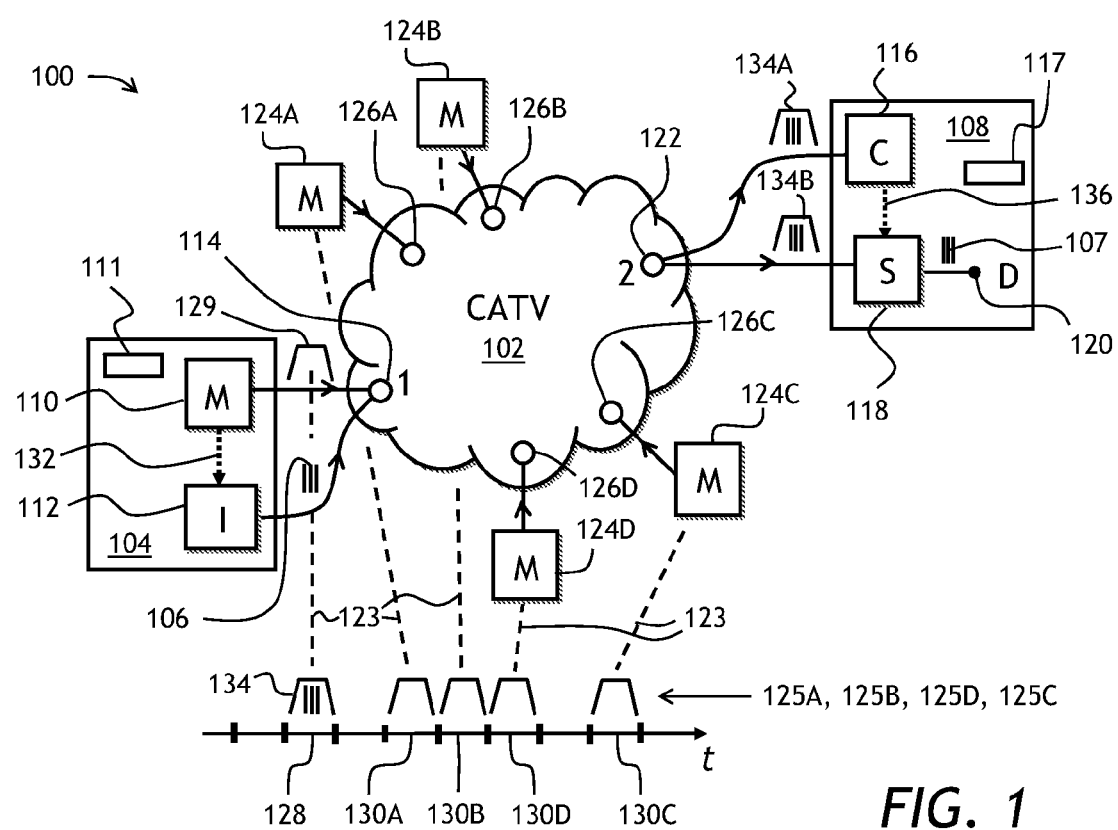
FIG. 1 is a diagram of a generic test system of the present invention for measuring a frequency response of a community antenna television (CATV) network.

Referring to FIG. 1, a diagram of a generic test system 100 of the present invention for testing a CATV cable plant 102 is shown having a transmitting device 104 for transmitting a test signal 106 and a receiving device 108 for receiving and processing a test signal 107. The transmitting device 104 has a modem 110 for sending and receiving modulated digital signals, an injector 112 for generating and injecting the test signal 106, and a controller 111 for controlling the modem 110 and the injector 112, and for transferring signals therebetween. The outputs of the modem 110 and of the injector 112 are coupled to a first test point 114 of the CATV plant 102. The receiving device 108 has a communication device 116 for sending and receiving modulated digital signals, a selector 118 for selecting the test signal 107, a detector 120 for measuring the amplitude, or the power level, of the signal 107, and a processor 117 for controlling the communication device 116, the selector 118, the detector 120, for transferring signals therebetween, and for processing test data. The inputs of the communication device 116 and of the selector 118 are coupled to a second test point 122 of the CATV plant 102. Other modems 124A to 124D are coupled to the CATV plant 102 at corresponding points 126A to 126D. The modems 124A to 124D can be located at the premises of the subscribers, not shown.

The function of the test system 100 will now be explained. Each modem coupled to the CATV plant 102 has a corresponding allocated time slot for sending modulated digital signals. For example, a time slot 128 is allocated for the modem 110, and time slots 130A to 130D are allocated for the modems 124A to 124D to send signals 125A to 125D, respectively, as shown by dashed lines 123. The test signal 106 is emitted during the time slot 128 allocated for the modem 110 to send a modulated digital signal 129. Preferably, the cable modem 110 is coupled to the injector 112 through a link 132 for providing, during a time within said allocated time slot 128, a signal invoking or permitting transmission of the test signal 106 generated by the injector 112. The test signal 106 has a narrow-band frequency sweep signal with an amplitude lower than that of an upstream modulated digital signal occupying the same frequency band as the test signal 106. Herefrom, this modulated digital signal is called a "target" signal, and its frequency band is called, correspondingly, a "target" frequency band. It should be noted that any upstream digital signal, not just the signal 129, can become a thus defined target signal; for example, the signals 125A to 125D generated by the modems 124A to 124D, respectively, can become target signals, if they occupy the target frequency band.

The frequency bandwidth of the injected sweep test signal 106 is preferably narrower than the frequency bandwidth of the target frequency band. The test signal 106 is preferably at a power level lower than the power level of the target signal. The low power level and, or the narrow frequency bandwidth of the test signal 106 are required to avoid impairing detection of the target signal. In this context, "impairing detection" means increasing a bit error rate (BER) of the detection to a level degrading quality of service to the subscriber. However, the test signal 106 has a sufficiently large amplitude to be able to be recovered at the receiving device 108.

The test signal 106, along with the modulated digital signal 129, is injected into the CATV plant 102 at the first test point 114. The signals 106 and 129, shown as a combined signal 134, propagate through the CATV cable plant 102 from the first test point 114 to the second test point 122, wherein said signals are coupled to the communication device 116 and the selector 118. These signals are shown as signals 134A and 134B, respectively. The communication device 116 is capable of providing, during a time within said allocated time slot 128, a signal to the selector 118 through a link 136 indicating to the selector 118 to start selecting a test signal. Preferably, the selector 118 suppresses all signals during the time that is outside of the allocated time slot 128. Further, preferably and advantageously, the selector 118 has a filter for filtering the narrowband signal 107 for detecting by the detector 120. The injected test signal 106 can be a single tone or multiple continuous wave (CW) tones, unmodulated or, preferably, modulated at a low frequency for additional selectivity. The technique of frequency-selective detection of the narrowband test signal 107 during the time slot 128 for the signal 129 generated by the modem 110 is called herein "ingress-under-the-carrier" technique. Any modulation type that is compatible with the ingress-under-the-carrier technique can be used. The amplitude of the measured signal 107 is then compared with the amplitude of the injected signal 106. The ratio of the amplitudes, at a given frequency, allows one to calculate the frequency response at that frequency.

The value of the amplitude, or power level, of the test signal 106 injected by the injector 112 is pre-determined. It can be sent to the modem 110 by a separate telemetry channel, or it can be sent to the modem 110 as a separate communication packet, not shown. The detector 120 provides feedback to the transmitting device 104, either through a telemetry signal or DOCSIS modem TCP/IP packet generated by the communication device 116, a correction value for the amplitude of the test signal transmission, which keeps the test signal 106 at a significantly lower power level than a DOCSIS upstream carrier power level, to minimize the effect of interference, while providing a power level sufficient for a reliable measurement to be performed by the detector 120. In this context, a "reliable measurement" is a measurement having a signal-to-noise ratio sufficient for the purposes of frequency response measurement between the points 114 and 122 of the CATV network plant 102.

In one embodiment of the present invention, the injected signal 106 can always be injected at a predetermined power level below a power level of the signal 129, whereby the relative power amplitude of the received sweep test signal can then be compared to the predetermined power level. Further, a signal propagation time delay may be present between a moment the signal 106 is injected at the first test point 114 and a moment it is received as the signal 107 by the detector 120. This delay can be compensated by implementing a corresponding time delay for the measurement time window of the receiver device 108. In other words, a reception time slot for reception of the signal 107 is delayed relative to the transmission time slot 128 for transmitting the signal 106 by a time of propagation of the signal 106 between the first and the second test points 114 and 122, respectively, of the CATV network.

Preferably, the transmitting device 104 is located at a remote location, and the receiving device 108 is located at a head end, not shown. However, it should be understood that the frequency sweep according to this invention can be accomplished in cases when the devices 104 and 108 are both located at remote locations, or when the transmitting device 104 is located at the head end, and the receiving device 108 is located at a remote location.

Figure 2:
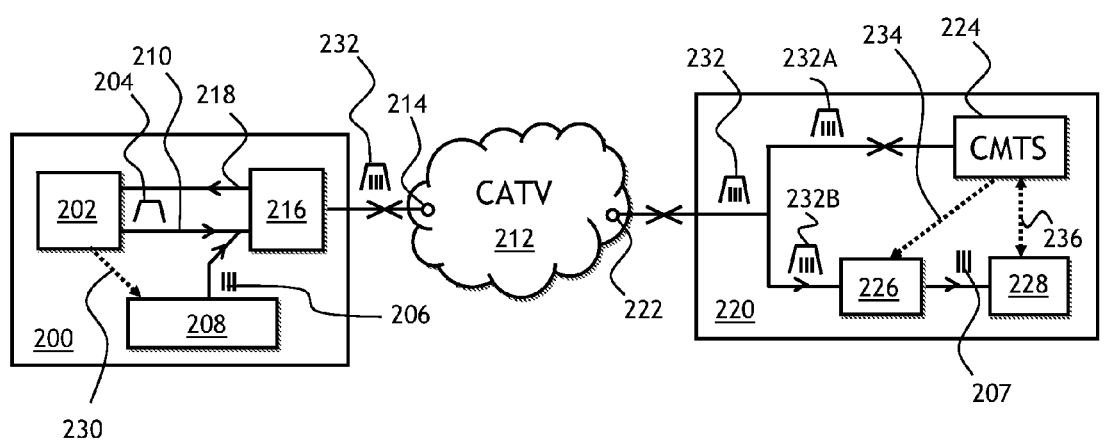
FIG. 2 is a diagram of a test system for measuring a frequency response on the upstream path of a CATV network.

Turning now to FIG. 2, a preferred embodiment of an upstream-path frequency sweep system is shown, in which a receiving device is located at the head end of a CATV network, and a transmitting device is located at a remote location. A testing device 200 includes a cable modem, e.g. a DOCSIS modem 202 for generating an outgoing modulated digital signal 204 multiplexed with an outgoing test signal 206 generated by a generator 208 on an upstream path 210 coupled to a CATV cable plant 212 at a test point 214. A diplexer 216 is used to separate incoming downstream signals on a forward, or downstream path 218 from the outgoing signals 204 and 206 on the upstream path 210, while providing a coupling of both the upstream path 210 and the downstream path 218 to the test point 214 of the CATV cable plant 212. The CATV cable plant 212 is connected to a CATV head end 220 at a point 222. The head end 220 includes a cable modem termination system (CMTS) 224 and a test sub-system having a selector 226 and a detector 228.

The transmission of the test signal 206 will occur during a time slot allocated for the cable modem 202 to transmit information, by generating the signal 204, to the CMTS 224. Preferably, the cable modem 202 is coupled to the generator 208 through a link 230 for providing, during a time within said allocated time slot, a signal invoking or permitting transmission of the test signal 206 generated by the generator 208. The injected test signal 206 contains a narrow-band frequency sweep signal with an amplitude lower than that of a target signal defined above. The frequency bandwidth of the test signal 206 is preferably narrower than the frequency bandwidth of the target frequency band, and the injected sweep test signal 206 is preferably at a power level sufficiently low, so as not to impair communications between the cable modem 202 and the CMTS 224. However, the test signal 206 has a sufficiently large amplitude to be recoverable and measurable at the head end 220.

The test signal 206 is combined with the modem signal 204, so as to form a signal 232 coupled to the test point 214 of the cable plant 212. The signal 232 propagates through the cable plant 212 from the test point 214 to the point 222, where said signal 232 is received by the head end 220. At the head end 220, the signal 232 is split into two signals 232A and 232B propagating towards the CMTS 224 and the selector 226, respectively. The signal 232A is detected in accordance with its modulation type, and is used to communicate information to the head end 224. The role of the selector 226 is to extract the signal 206 from the compound signal 232B, by either frequency filtering, or time domain multiplexing, or preferably both. At its output, the selector 226 produces an extracted signal 207 having an amplitude proportional to the amplitude of the test signal 206 at the point 222. A signal indicating a time slot appropriate for receiving the test signal 206 is communicated in the embodiment shown in FIG. 2 through a link 234 connecting the CMTS 224 with the selector 226. Preferably, the selector 226 suppresses all signals during the time that is outside of said time slot. The extracted signal 207 is detected by a detector 228 for measuring an amplitude of the signal 207. An optional link 236 can be used to time-gate the detector 228, so as to provide a synchronous detection of the signal 207.

The injected test signal 206 can be a single tone or multiple continuous wave tones, unmodulated or, preferably, modulated at a low frequency for additional selectivity. Any modulation type that is compatible with the ingress-under-the-carrier technique can be used. The amplitude of the measured signal 207 is then compared to the amplitude of the injected signal 206. The ratio of the amplitudes, at a particular frequency, allows the calculation of the frequency response.

The value of the amplitude, or power level, of the test signal 206, which has been injected by the generator 208, can be sent to the CMTS 224 over a separate telemetry channel, or it can be sent by the modem 202 either as part of the transmit burst 204, or as a separate communication packet, not shown. The detector 228 will provide feedback to the field testing device 200, either through a telemetry signal or DOCSIS modem TCP/IP packet generated by the CMTS 224, a correction value for the amplitude of the test signal transmission, which will keep the test signal 206 at a significantly lower power level than a DOCSIS upstream carrier power level, to minimize the effect of interference at the head end 224, while providing a power level sufficient for a reliable measurement to be performed by the detector 228.

Figure 3:
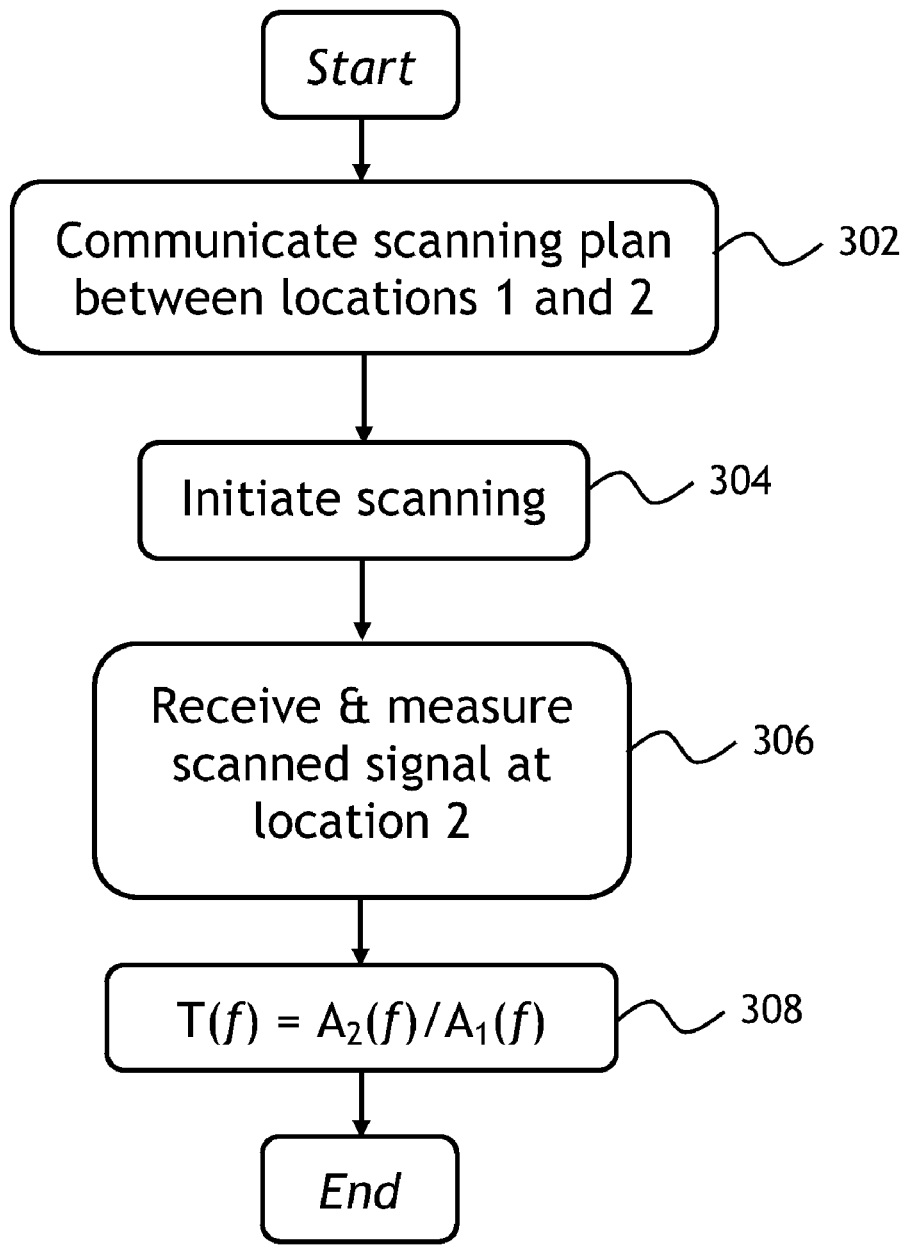
FIG. 3 is a block diagram of a testing method according to the present invention, involving communicating a frequency scanning test plan.

Referring now to FIG. 3, a block diagram of a method for measuring a frequency response of a CATV network is shown, wherein the frequency of a test signal is swept according to a pre-defined frequency sweep plan. The testing method of FIG. 3 involves a step 302 of communicating a frequency scanning test plan between the injection and the measurement points, termed locations 1 and 2, respectively, through a telemetry channel or through a modem data transmission as has been explained above. The scanning plan involves a set of frequency points, or frequencies at which the measurement is to be performed, as well as a corresponding set of values of amplitudes of the test signal at each of these frequencies. The values of the amplitudes can be equal, or alternatively they can be different from each other, to provide a better signal-to-noise ratio at unallocated frequencies, for example. The scanning is initiated at a step 304; the scanned signal is received and measured at location 2 at a step 306; the frequency response T(f) is determined at a step 308 by calculating a ratio of the amplitudes of the received and injected test signal $A_2(f)$ and $A_1(f)$, respectively.

Figure 4:
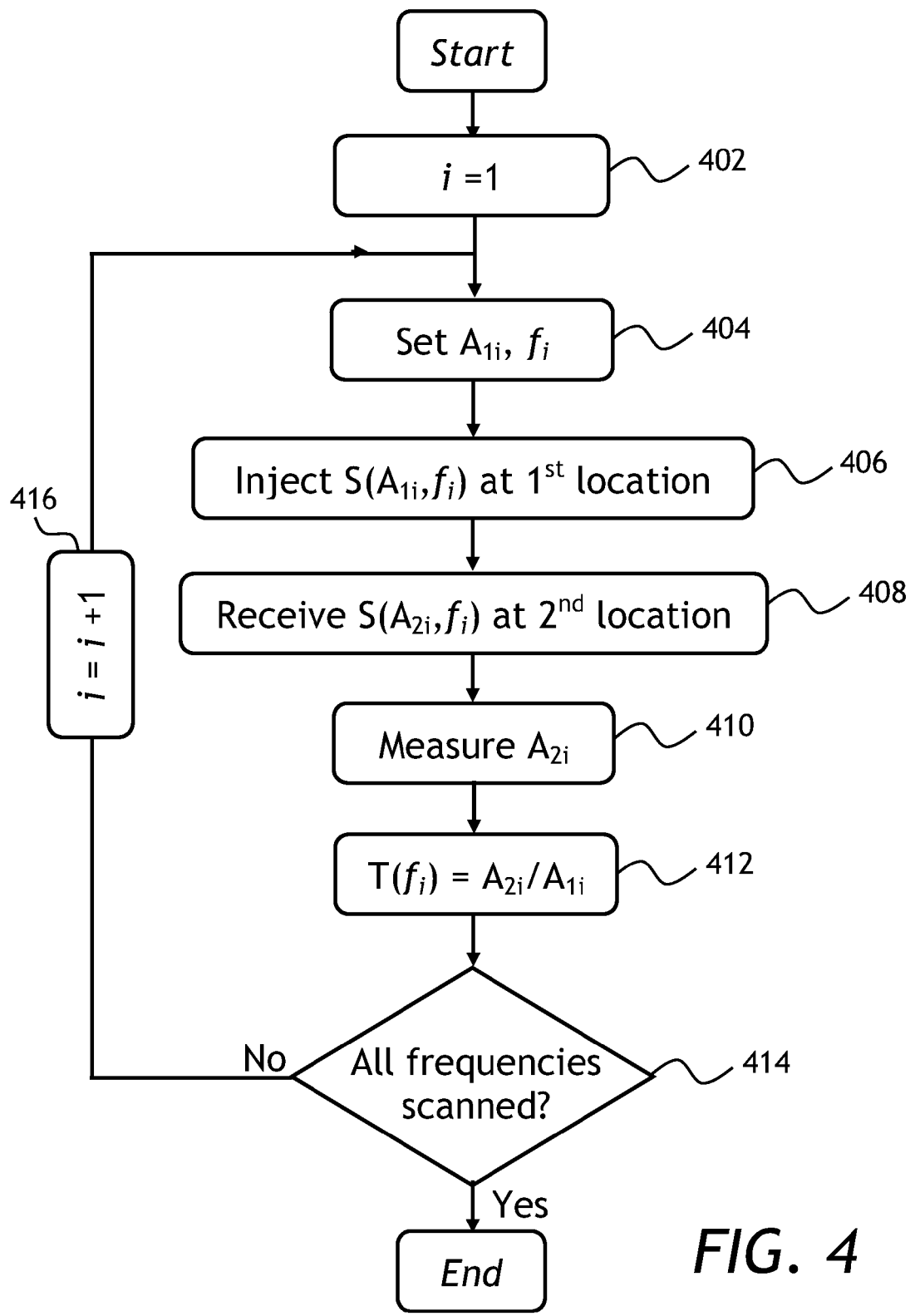
FIG. 4 is a block diagram of a testing method according to the present invention, involving a point-by-point measurement at a given frequency.

Turning now to FIG. 4, a block diagram of a method for measuring a frequency response of a CATV network is presented, wherein the frequency is scanned point-by-point. A frequency point, that is, a value of frequency of a test signal at which a measurement is taken, is indexed by an index i. At a step 402, the index i is assigned a value of 1, which means that a first frequency point is to be measured. At a step 404, the amplitude and the frequency values are communicated to a transmitting device at a first location of the network. At a step 406, the transmitting device injects the signal at the first location; at a step 408, the receiving device receives the signal $S(A_{2i}, f_i)$ at a second location of the network. The amplitude $A_{2i}$ is measured at a step 410, and the frequency response $T(f_i)$ is determined at a step 412 by calculating, at the appropriate $f_i$, a ratio of the amplitudes of the received and injected test signal $A_{2i}$ and $A_{1i}$, respectively. At a step 414, a check is performed whether all the frequencies have been scanned; if not, the index i is incremented by one at a step 416, an the steps 404 to 414 are repeated; if yes, the procedure ends.

Figure 5:
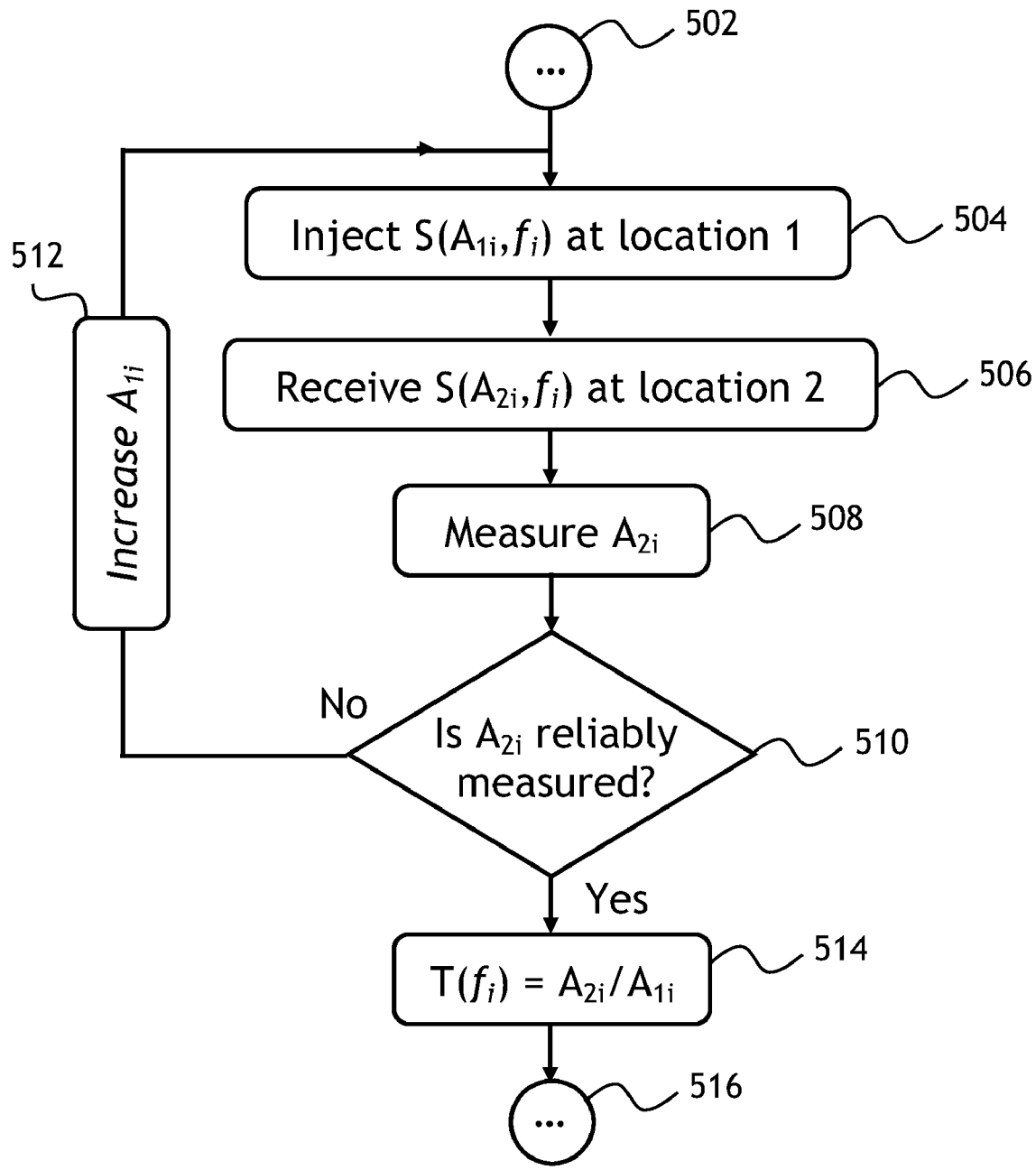
FIG. 5 is a block diagram of a testing method according to the present invention, involving adjusting amplitude of a test signal according to a result of a previous measurement.

Measuring the frequency response point-by-point has an advantage that a noisy measurement can be repeated at a higher amplitude of the test signal, without having to sweep all frequencies again. Referring now to FIG. 5, a block diagram of a method for measuring a frequency response of a CATV network is presented, wherein a measurement step that had an insufficient signal-to-noise ratio can be re-taken at an increased amplitude of the injected signal. In the block diagram of FIG. 5, a circle 502 denotes previous steps such as setting the test signal frequency and amplitude for the forthcoming measurement. At a step 504, the transmitting device injects the signal at the first location; at a step 506, the receiving device receives the signal $S(A_{2i}, f_i)$ at a second location of the network. The amplitude $A_{2i}$ is measured at a step 508. At a step 510, the result of the measurement performed at the step 508 is evaluated. For example, a few measurements can be taken at the step 508, and the measured amplitudes of those few measurement can be compared to each other. If they differ by more than a pre-defined threshold value, then a conclusion is made that $A_{2i}$ has not been reliably received and measured. In this instance, an amplitude of the injected signal $A_{1i}$ is increased by a fixed amount at step 512, and the steps 504 to 508 are repeated at the same frequency $f_i$. If the measurement is acceptable, then the frequency response $T(f_i)$ is determined at a step 514 by calculating, at the frequency $f_i$, a ratio of the amplitudes of the received and injected test signal $A_{2i}$ and $A_{1i}$, respectively. Then, subsequent steps 516 are performed.

Figure 6:
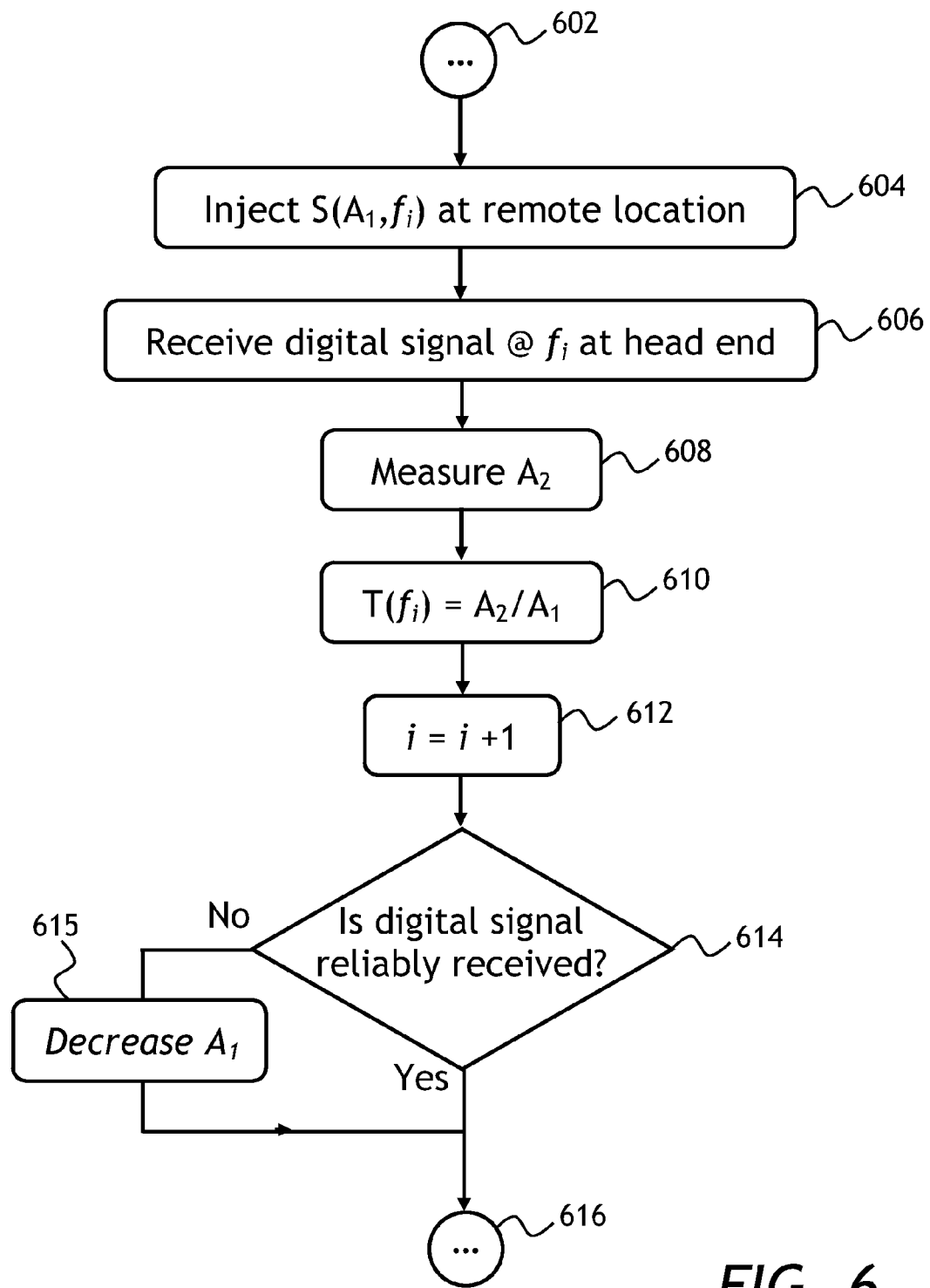
FIG. 6 is a block diagram of another testing method according to the present invention, involving adjusting amplitude of a test signal according to a digital signal reception.

Turning now to FIG. 6, a block diagram of a method for measuring a frequency response of a CATV network is presented, wherein an amplitude of the frequency-scanned test signal can be adjusted down when an interference with a digital signal reception is detected. This method is particularly suitable for a system presented in FIG. 2, that is, for a system for an upstream signal path frequency sweep, wherein a test signal is injected at a remote location and is detected at the head end of the CATV network. In the block diagram of FIG. 6, a circle 602 denotes previous steps such as setting frequency for the forthcoming measurement. At a step 604, the transmitting device injects the signal $A_1$ at a remote location. Note that in this example the amplitude of the injected signal does not depend on frequency, for simplicity. At a step 606, the receiving device receives the signal $S(A_2, f_i)$ at the head end of the network. The amplitude $A_2$ is measured at a step 608, and the frequency response $T(f_i)$ is determined at a step 610 by calculating, at the frequency $f_i$, a ratio of the amplitudes of the received and injected test signal $A_2$ and $A_1$, respectively. At a step 612, the index i is incremented. At a step 614, a check is performed whether sending the signal $A_1$ has resulted in an interference with reception of a modulated digital signal by a CMTS of the head end, for example CMTS 224 of the head end 220 of FIG. 2. If the digital signal has not been reliably received, that is, if there has been interference of the digital signal with the test signal, then the value of the amplitude $A_1$ is decreased at a step 615. This decreased amplitude value will be used for the next measurement steps denoted with a circle 616. If there has been no interference detected between the digital and the test signals, that is, if there has been no interruption of the digital signal reception at the time when the test signal arrived at the head end, then the subsequent steps 616 are performed without decreasing the amplitude $A_1$.

Figure 7:
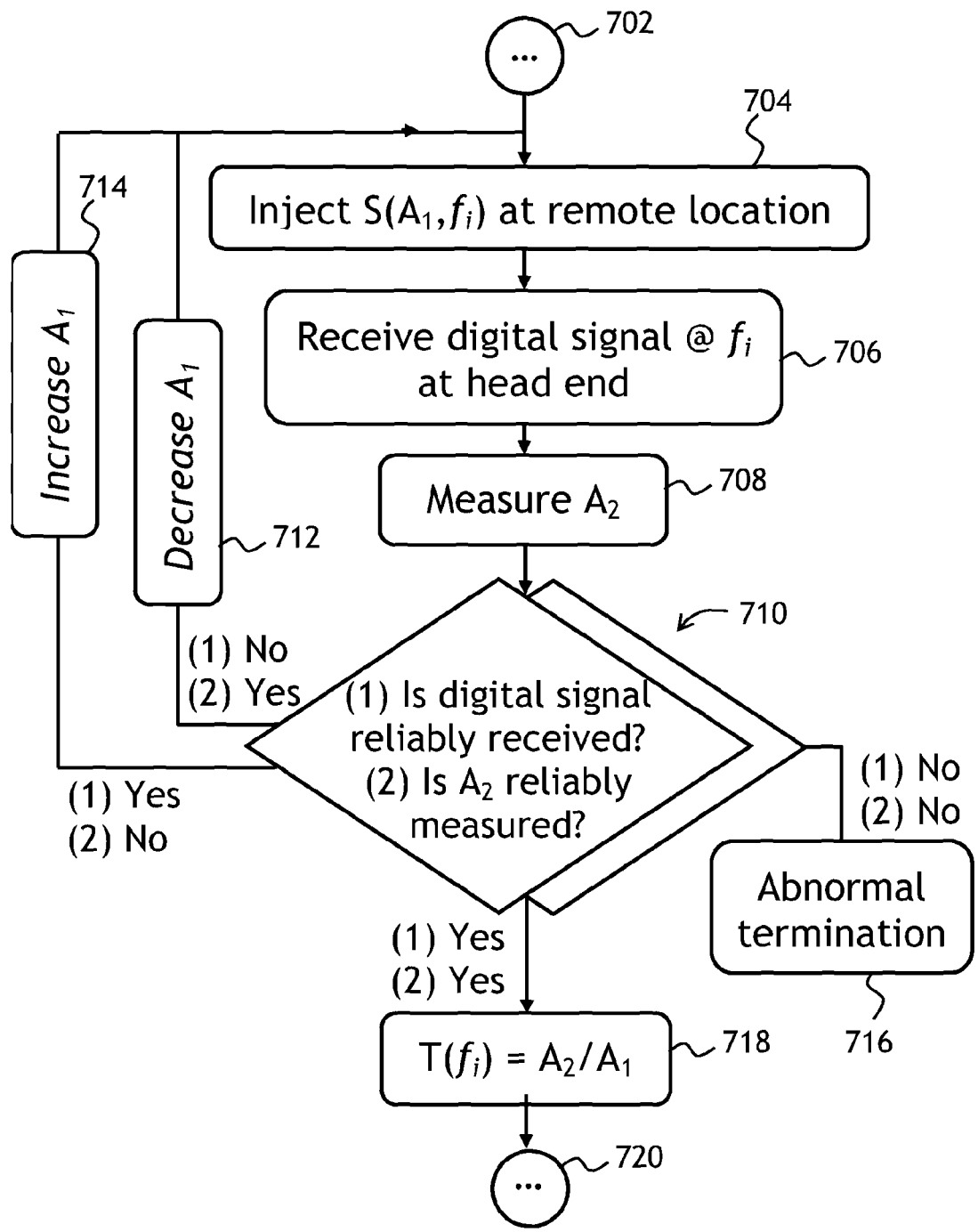
FIG. 7 is a block diagram of yet another testing method according to the present invention, involving adjusting amplitude of a test signal according to both a result of a previous measurement and a digital signal reception.

The methods of adjusting the test signal amplitude shown in FIGS. 5 and 6 can be combined, for the benefit of providing for a frequency scan with an adaptable amplitude of the test signal. Referring now to FIG. 7, a block diagram of a method for measuring a frequency response of an upstream path in a CATV network is presented, wherein an amplitude of the frequency-scanned test signal can be adjusted both up and down, so as to provide a frequency sweep with high enough signal-to-noise ratio that nonetheless does not impair the reception of modulated digital signals used in a CATV network for broadcasting digital television programs, Internet services, VoIP phone services, and the like. In the block diagram of FIG. 7, a circle 702 denotes previous steps such as setting frequency for the forthcoming measurement. At a step 704, the transmitting device injects a signal $A_1$ at a remote location. Note that in this example, for the sake of simplicity, the amplitude of the injected signal does not depend on frequency. At a step 706, the receiving device receives the signal $S(A_2, f_i)$ at a second location of the network. The amplitude $A_2$ is measured at a step 708. At a step 710, a dual check is performed. First, a check is performed whether sending the signal $A_1$ has resulted in an interference with reception of a modulated digital signal by a CMTS of the head end, for example CMTS 224 of the head end 220 of FIG. 2. Second, the result of the measurement performed at the step 708 of FIG. 7 is evaluated. For example, a few measurements can be taken at the step 708, and the measured amplitudes of those few measurements can be compared to each other. If the measured amplitudes differ by more than a pre-defined threshold value, a conclusion is made that $A_2$ has not been reliably received and measured. Of course, the steps of the dual check 710 can be done in the opposite order. Whatever is the order of performing the two steps of the dual check 710, there are four possible outcomes. First, if the digital signal has not been reliably received, that is, if there has been interference of the digital signal with the test signal, but the test signal was measured reliably, then the amplitude $A_1$ is decreased at a step 712, and the steps 704 to 708 are repeated. Second, if the digital signal has been reliably received, but the test signal has not been reliably measured, then the amplitude $A_1$ is increased at a step 714, and the steps 704 to 708 are repeated. Third, if the digital signal has not been reliably received, and the test signal has not been reliably measured, then the sweep test stops abnormally at a step 716. Finally, fourth, if the digital signal has been reliably received, and the test signal has been reliably measured, then the frequency response $T(f_i)$ is determined at a step 718 by calculating, at the frequency $f_i$, a ratio of the amplitudes of the received and injected test signal $A_2$ and $A_1$, respectively. Then, subsequent steps 720 are performed.

A number of modifications of the methods represented by diagrams of FIGS. 3 to 7 are possible without deviating from the spirit and the scope of the present invention. For example, adjustments of the amplitude of the test signal can be done from a constant amplitude, equal for all frequency points, or the adjustments can be viewed as deviations from a pre-defined test plan stored at the transmitting and, or receiving location.

What is claimed is:

1. A method for measuring a frequency response between a first test point and a second test point of a cable television (CATV) network comprising: a head end for generating and receiving modulated digital signals, wherein each said modulated digital signal occupies a pre-defined frequency band; and a cable plant for propagating said modulated digital signals, wherein a cable modem is operationally coupled to the first test point, the method comprising:
(a) injecting, at the first test point, a test signal having an amplitude and a first frequency, wherein the injecting of the test signal occurs during a transmission time slot allocated by the head end for the modem to transmit a signal to the head end;
wherein the frequency of the injected test signal is within a target frequency band and wherein the target frequency band is one of the pre-defined frequency bands, and wherein a bandwidth of the test signal is sufficiently narrow so as not to impair reception of a modulated digital signal occupying said target frequency band, wherein said modulated digital signal is a target signal distinct from the injected test signal;
wherein the amplitude of the injected test signal is sufficiently low so as not to impair reception of said target signal; and
the amplitude of the injected test signal is sufficiently high so as to be measurable at the second test point;
(b) receiving the test signal at the second test point during a reception time slot that is delayed relative to the transmission time slot by a time of propagation of the test signal between the first and the second test points of the CATV network;
(c) measuring the amplitude of the test signal at the second test point during the reception time slot;
wherein during step (b), or (c), or both, all signals received during a time that is outside of the reception time slot are suppressed;
(d) dividing the amplitude of the received signal by the amplitude of the injected signal, so as to obtain the frequency response of the CATV network between the first and the second test points at the first frequency; and
(e) repeating steps (a) to (d) at a second frequency different from the first frequency, so as to obtain the frequency response of the CATV network between the first and the second test points at the second frequency.

2. A method of claim 1, wherein the first test point is located at the cable plant, and the second test point is located at the head end of the CATV network.

3. A method of claim 1, wherein the first test point is located at the head end, and the second test point is located at the cable plant of the CATV network.

4. A method of claim 1, wherein the amplitude of the test signal is lower than the amplitude of the target signal.

5. A method of claim 1, wherein the test signal comprises a continuous wave (CW) tone.

6. A method of claim 5, wherein the CW tone is modulated.

7. A method of claim 1, wherein the amplitude of the test signal is a pre-determined fraction of the amplitude of the target signal.

8. A method of claim 1, wherein the method further comprises a step (f), at which a value of the amplitude and, or a value of the frequency of the injected test signal is communicated between the first and the second test points.

9. A method of claim 8, wherein a telemetry channel is used at step (f) to communicate said value of amplitude and, or frequency of the injected test signal.

10. A method of claim 8, wherein in step (f), the said value of amplitude and, or frequency of the injected test signal is encoded into a data packet received and, or transmitted by the modem.

11. A method of claim 8, wherein step (f) comprises a step of providing a feedback from the second to the first test point whenever a correction of the amplitude of the test signal is required.

12. A test system for measuring a frequency response between a first test point and a second test point of a cable television (CATV) network comprising: a head end for generating and receiving modulated digital signals, wherein each said digital signal occupies a pre-defined frequency band; and a cable plant for propagating said modulated digital signals; wherein the test system comprises:

a cable modem operationally coupled to the first test point, for generating and receiving modulated digital signals;

an injector operationally coupled to the first test point, for injecting, during a transmission time slot allocated by the head end for the modem to transmit a signal to the head end, a test signal having an amplitude and a test frequency, and for suppressing said test signal during a time that is outside of the transmission time slot, wherein:

the frequency of the test signal to be injected is within a target frequency band, wherein the target frequency band is one of the pre-defined frequency bands, and a bandwidth of the test signal is sufficiently narrow so as not to impair reception of a modulated digital signal occupying said target frequency band, wherein said modulated digital signal is a target signal distinct from the test signal;

the amplitude of the test signal to be injected is sufficiently low so as not to impair reception of said target signal; and the amplitude of the test signal to be injected is sufficiently high so as to be measurable at the second test point;

an injector controller operationally coupled to the modem and to the injector, for receiving a digital signal from the cable modem and for controlling, in dependence upon said received digital signal, values of the amplitude and the frequency of the test signal to be injected during the transmission time slot;

a selector operationally coupled to the second test point, for suppressing the target signal and selecting the test signal at the test frequency during a reception time slot that is delayed relative to the transmission time slot by a time of propagation of the test signal between the first and the second test points of the CATV network;

a detector operationally coupled to the selector, for receiving the selected test signal from the selector and for measuring the amplitude of the selected test signal during the reception time slot;

wherein either detector or selector, or both, comprise a circuit for suppressing all signals during a time that is outside of the reception time slot;

a communication device operationally coupled to the second test point, for generating and receiving modulated digital signals; and a processor operationally coupled to the communication device, to the selector, and to the detector, for communicating to the injector controller the values of the amplitude and, or the frequency of the test signal to be injected, by causing the communication device to send a corresponding modulated digital signal through the CATV network;

for communicating the value of the frequency of the test signal to the selector;

for obtaining the measured amplitude of the received test signal from the detector; and for dividing the measured amplitude by the injected amplitude of the test signal, so as to obtain the frequency response of the CATV network between the first and the second test points, at the frequency of the test signal.

13. A system of claim 12, wherein the first test point is located at the cable plant, and the second test point is located at the head end of the CATV network.

14. A system of claim 12, wherein the first test point is located at the head end, and the second test point is located at the cable plant of the CATV network.

15. A system of claim 12, wherein the processor is suitably programmed so as to cause the amplitude of the test signal to be injected to be lower than the amplitude of the target signal.

16. A system of claim 12, wherein the injector is constructed to generate a continuous wave (CW) tone.

17. A system of claim 16, wherein the injector is constructed to generate a modulated CW tone.

18. A system of claim 12, wherein the processor is suitably programmed for causing the amplitude of the test signal to be a pre-determined fraction of the amplitude of the target signal.

* * * * *